(12) United States Patent
Knibbe et al.

(10) Patent No.: US 7,786,925 B1
(45) Date of Patent: Aug. 31, 2010

(54) DETERMINATION OF THE OUTLINE OF AN ELEVATED OBJECT

(75) Inventors: Peter W. Knibbe, Philadelphia, PA (US); John B. Stetson, New Hope, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/464,931

(22) Filed: May 13, 2009

(51) Int. Cl.
*G01S 13/89* (2006.01)
*G01S 13/86* (2006.01)

(52) U.S. Cl. .............................. 342/52; 342/54; 342/59; 342/90; 342/140; 342/179; 342/95; 342/97

(58) Field of Classification Search .................. 342/52, 342/54, 55, 59, 90, 95–97, 107, 123, 126, 342/139, 140, 179, 25 A, 25 B
See application file for complete search history.

(56) References Cited

U.S. PATENT DOCUMENTS

| | | | |
|---|---|---|---|
| 4,777,489 A * | 10/1988 | Allan | 342/176 |
| 4,817,495 A * | 4/1989 | Drobot | 89/1.11 |
| 5,093,563 A * | 3/1992 | Small et al. | 250/201.9 |
| 5,206,499 A * | 4/1993 | Mantravadi et al. | 250/203.6 |
| 5,410,143 A * | 4/1995 | Jones | 250/206.1 |
| 5,652,588 A * | 7/1997 | Miron | 342/58 |
| 7,105,791 B1* | 9/2006 | Poller | 250/203.1 |
| 2006/0110007 A1* | 5/2006 | Yanagisawa et al. | 382/103 |
| 2008/0063237 A1* | 3/2008 | Rubenstein | 382/103 |
| 2009/0177398 A1* | 7/2009 | Belenkii et al. | 701/220 |
| 2009/0303110 A1* | 12/2009 | Gregory et al. | 342/25 A |
| 2010/0060962 A1* | 3/2010 | Rosen | 359/29 |

* cited by examiner

*Primary Examiner*—John B Sotomayor
(74) *Attorney, Agent, or Firm*—Duane Morris LLP (57) ABSTRACT

A method and apparatus determines the shape of an orbiting or airborne object. A radar determines the general location and a telescope is directed toward the object to form an image of background stars, which will be occluded by the object. The image is compared with a memorized star map, to identify the region of the image in the map. Stars visible in the map which are not visible in the image are listed. The invisible stars are paired with next adjacent visible stars to form star pairs. The midpoints are identified of lines extending between star pairs. Segment lines are drawn between a midpoint and the next closest midpoint. The segment lines define an outline of the object.

10 Claims, 5 Drawing Sheets

DETERMINATION OF THE OUTLINE OF AN ELEVATED OBJECT

BACKGROUND OF THE INVENTION

Determination of the status of spacecraft has been determined in the past by reporting by telemetry on measurements performed on the spacecraft, by direct observation, and by radar and telescopic viewing. Objects in near-Earth space may lie in the earth's umbra or shadow, and thus may not be observable directly or by means of a telescope. Even when illuminated, details of an object in near Earth space may be difficult or impossible to view, as light from the illuminating source may impinge on the side facing away from the viewer, so that the observable side of the object is in shadow.

Improved or alternative methods for viewing near-Earth-space objects is desired.

SUMMARY OF THE INVENTION

A method according to an aspect of the invention is for determining the projected shape of an object in an Earth orbit, where the orbit includes periods of time in which the object is in Earth's umbra or shadow. The method comprises the steps of radar tracking of the object in order to determine its approximate ephemera. The term ephemeris may include any one or all of range, altitude, apogee, axis of orbit and phase of the orbit and location. A "local" radar system is deployed in a location at which it is capable of viewing the object; this local radar system may be the same one as that by which the ephemera are determined, or it may be another radar system. In any case, the local radar system is operated to determine the range, azimuth and elevation of the object relative to the local radar. An optical telescope is deployed at a location at which it is capable of viewing the region in which the object is located, and which has a known relationship to the location of the local radar. Using coordinate transformations as may be required, the optical telescope is pointed toward the object, thereby producing an image of background stellar objects in an angular field of view encompassing the object. A memorized map of stellar objects is provided, which preferably encompasses at least the field-of-view of the telescope. The image(s) of relevant ones of the background stellar objects produced by the telescope is (are) compared with the memorized representation of the stellar objects as they would be expected in an unocculted field of view, to thereby identify those stellar objects which are occulted by the object. Using a computer processor, an outline of the object is determined from the occulted telescopic image and the unocculted memorized star map. This gives an instantaneous outline of the object. In another mode of the method, the steps are repeated of (a) pointing the optical telescope toward the object, (b) comparing the image of background stellar objects with a memorized representation, and (c) using a computer processor, determining from the occulted and unocculted fields of view an outline of the object, thereby generating a time sequence of outlines of the object, which reveals any changes as a function of time in the projected shape of the object. The outline(s) of the object may be displayed on a monitor.

In a particular mode of a method according to an aspect of the invention, the step of comparing the image of background stellar objects with a memorized representation of the stellar objects as they would be expected in an unocculted field of view, to thereby identify those stellar objects which are occulted by the object includes the steps of obtaining coordinates and brightness of at least some of the relevant stellar objects within the field of view, such as those stellar objects with brightness greater than a given value, and, using at least pointing, location, and time information, determining that portion of the memorized representation of the stellar objects which corresponds to the field of view. Coordinates and brightness are obtained for relevant ones of the stellar objects in the memorized representation. Least-squared optimization is performed on apparent locations of stellar objects in the portion of the memorized representation and in the image in the field of view, to thereby align the image with the corresponding portion of the memorized representation. The locations of relevant stellar objects found in that portion of the memorized representation which are missing from the image are listed.

In a particular mode of a method according to an aspect of the invention, the step of determining from the occulted and unocculted fields of view an outline of the object comprises the step of finding that one of the relevant visible stellar objects in the image which is closest to one of the stellar objects missing from the image. Each of the stellar objects which is missing from the image is paired with the closest one of the visible stellar objects, to thereby form a stellar object pair. A stellar object pair line is generated for each relevant stellar object pair; the stellar object pair line extends from the location of the missing one of the pair of stellar objects to the visible one of the pair of stellar objects. The midpoint of each of the stellar object pair lines is determined. The midpoint of one of the stellar object pair lines is connected by an outline segment to the midpoint of the next adjacent one of the stellar object pair lines. The step(s) of connecting the midpoint is repeated until all of the midpoints are connected by outline segments to adjacent ones of the midpoints. An image of the outline segments is displayed.

An apparatus according to an aspect of the invention is for determining the shape of an elevated object, such as an airborne or orbiting object. The apparatus comprises a radar system at a known location. The radar system uses electromagnetic radiation to determine the range, pointing azimuth and elevation of the elevated object. A telescope is provided at a known location relative to the location of the radar system. The telescope is directed toward the elevated object for generating an image of the object occulting a field of background stellar objects. A memorized map is provided of the locations and brightness of stellar objects in a region, which region desirably includes at least the region of the image. A display is provided for displaying an outline of the elevated object. A processor is provided for comparing the map with the image, for correlating the map with the image, and for identifying relevant stellar objects which are found in the map but missing from the image, and for generating from the missing and present stellar objects the outline of the object.

DESCRIPTION OF THE INVENTION

Figure 1:
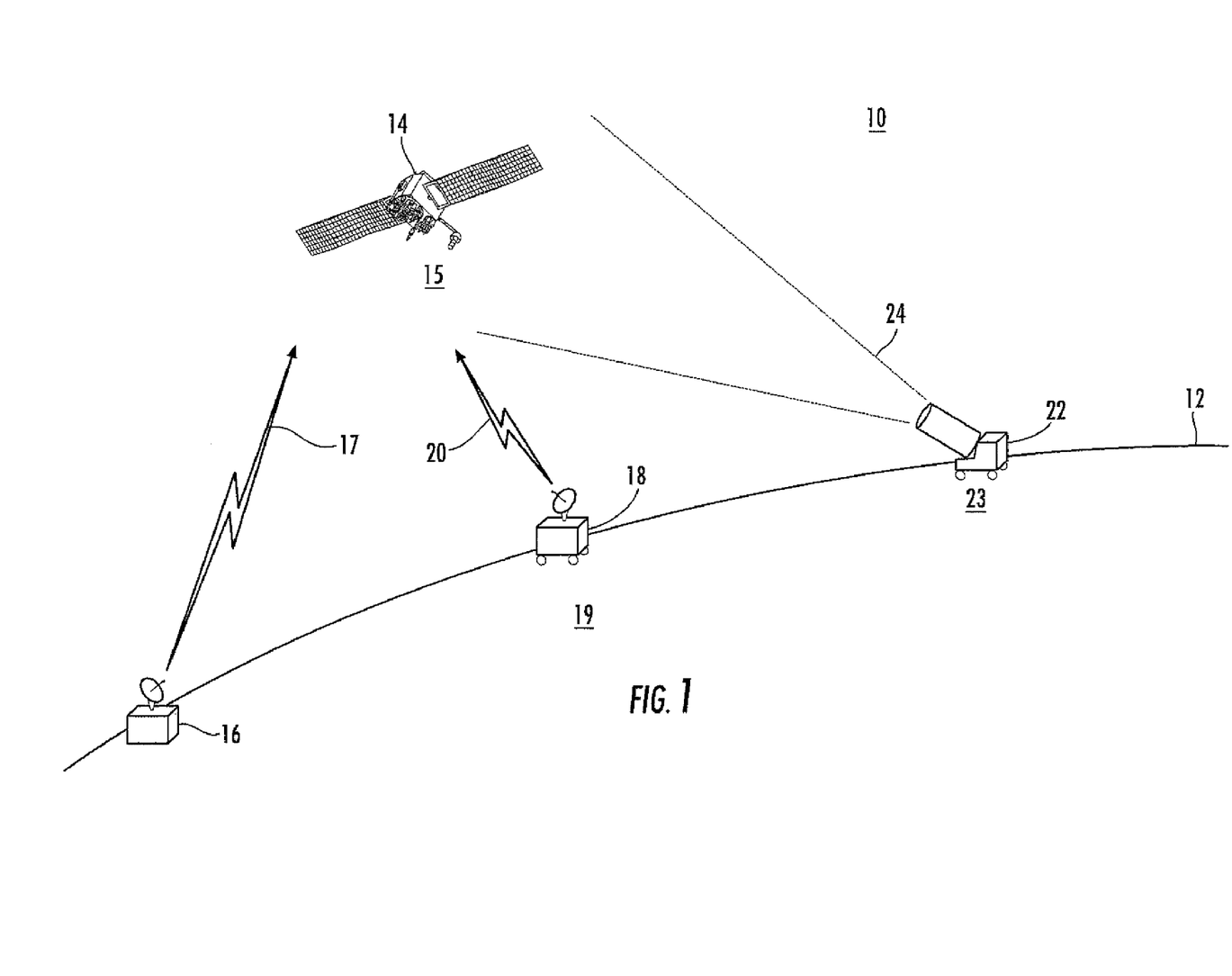
FIG. 1 is a representation of a portion of the Earth's surface and a near-Earth portion of space, showing first and second radar systems and an optical telescope observing an object in near-Earth space.

In scenario 100 of FIG. 1, the Earth's horizon is designated as 12, and a near-Earth-orbit object illustrated as 14 lies in a region 15 of Earth's shadow or umbra. That is, the sun is on the other side of the Earth from that illustrated, so object 14 is in eclipse. A volume scanning radar illustrated as 16 uses radar signals illustrated by a lightning bolt symbol 17 to determine the ephemeris of the object 14. Ephemeris means a table of values which gives the position of astronomical objects in the sky at a given time or times. Thus, operation of the radar system 16 establishes the general orbital location of object 14.

Also in FIG. 1, another radar system (or possibly the same as radar system 16) illustrated as 18 is placed at a location 19, at which location it is capable of viewing the region occupied by object 14. The coordinates of location 19 must be known, as for example by use of a global positioning system (GPS), and the orientation of the radar 18 must also be known. Radar 18 is operated to generate radar signals 20 to determine the range to the object 14, and pointing azimuth and elevation.

Also in FIG. 1, an optical telescope 22 at a location 23 has a field-of-view illustrated as 24 which encompasses the object 14. Consequently, the field of view of telescope 22 also encompasses the star field which is the background of the image of object 14. The coordinates and orientation of telescope 22 are also determined. While the radar 18 and telescope 22 of FIG. 1 are illustrated as being at generally the same location, the locations are not the same, and may be significantly different.

Figure 2:
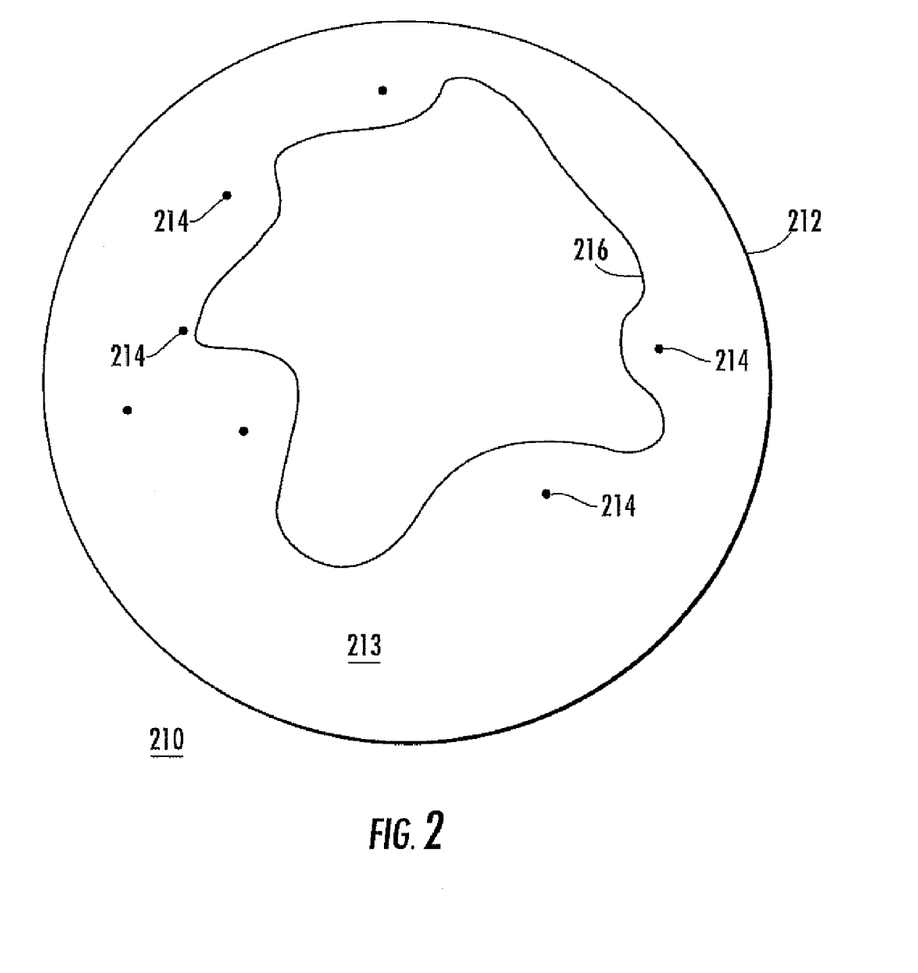
FIG. 2 is a representation of the view through the telescope of FIG. 1, showing an outline of a near-Earth-space object and some background stellar objects.

FIG. 2 is a representation of an image 210 produced by telescope 22 of FIG. 1. In FIG. 2, the circumscribing circle 212 represents the field of view of telescope 22. Within the image 210 a plurality of stars of a star field 213 are illustrated by dots, some of which are designated 214. A shape 216 is taken as representing the projected view of the object 14. No star images appear within the projected outline 216 of object 14.

While the number of stellar objects represented by dots 214 in FIG. 2 is small, it will be understood that the number of stars in an actual image will be vast. If the distribution of background stars were uniform throughout the field of view, a human observer could easily determine the shape of the object as a dark patch within the star field of the telescope, assuming that the perturbations occasioned by atmospheric turbulence and the need for magnification were not important.

However, human decision making may not be appropriate under many conditions, such as when observations must be continued for long periods of time, which would result in fatigue of a human observer, and consequent error. The distribution of stars in the sky is not in fact uniform as seen from the Earth. Thus, automated methods for monitoring the shape(s) of orbiting objects during occultation are desirable.

Toddlers learn by playing peek-a-boo with their mothers that objects continue their existence even though concealed by an intervening object. The occultation of stars by an intervening object can provide information about the shape of the intervening object.

Figure 3:
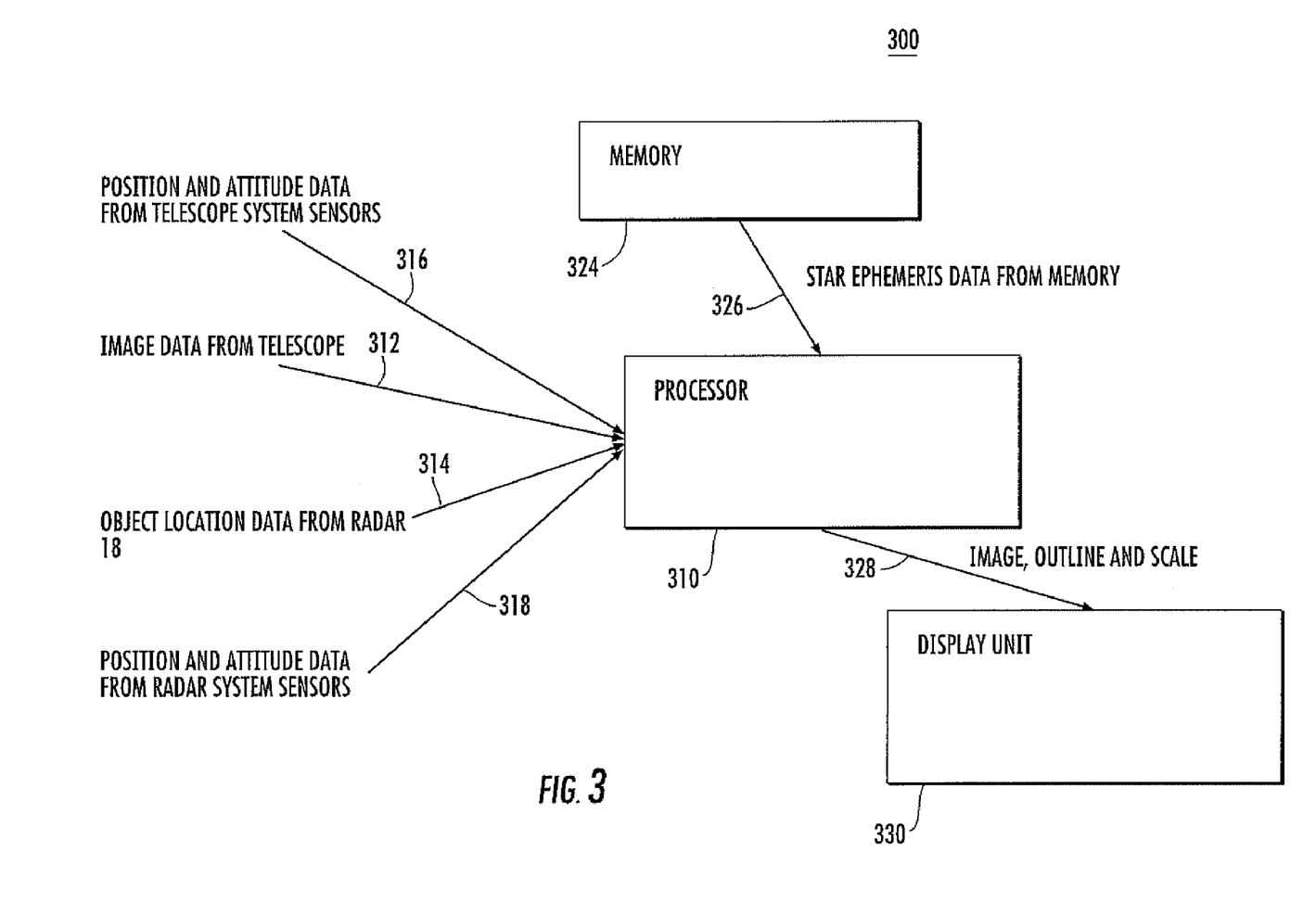
FIG. 3 is a simplified block diagram of a system according to an aspect of the invention, including a memory preprogrammed with one or more star charts, a source of ephemeris information, a computer processor, and displays for the outline of the object and for object dimension information.

FIG. 3 is a simplified block diagram illustrating additional structure 300 which is used in conjunction with the arrangement of FIG. 1 to determine the outline of a near-Earth object. In FIG. 3, telescope image information is digitized if not already in digital form, and applied by way of a path 312 to a computer processor 310. Processor 310 also receives object ephemeris information by way of path 314. Radar 18 and telescope 22 may each include a sensor suite for determination of location and orientation. Information about the location and orientation of the radar 18 and telescope 22 is applied by paths 316 and 318 from associated sensor suites. Computer processor 310 has available star chart data either on-line or by way of memory. In FIG. 3, the star chart or star map data is illustrated as coming from memory 324 via path 326. Processor 310 of FIG. 3 processes the telescope image in conjunction with the star maps and the location and orientation information to produce an outline of the object 14 of FIG. 1. Processor 310 also produces information about the size of the object. The object outline and size information is made available, via a path 328, to a display designated 330.

Figure 4:
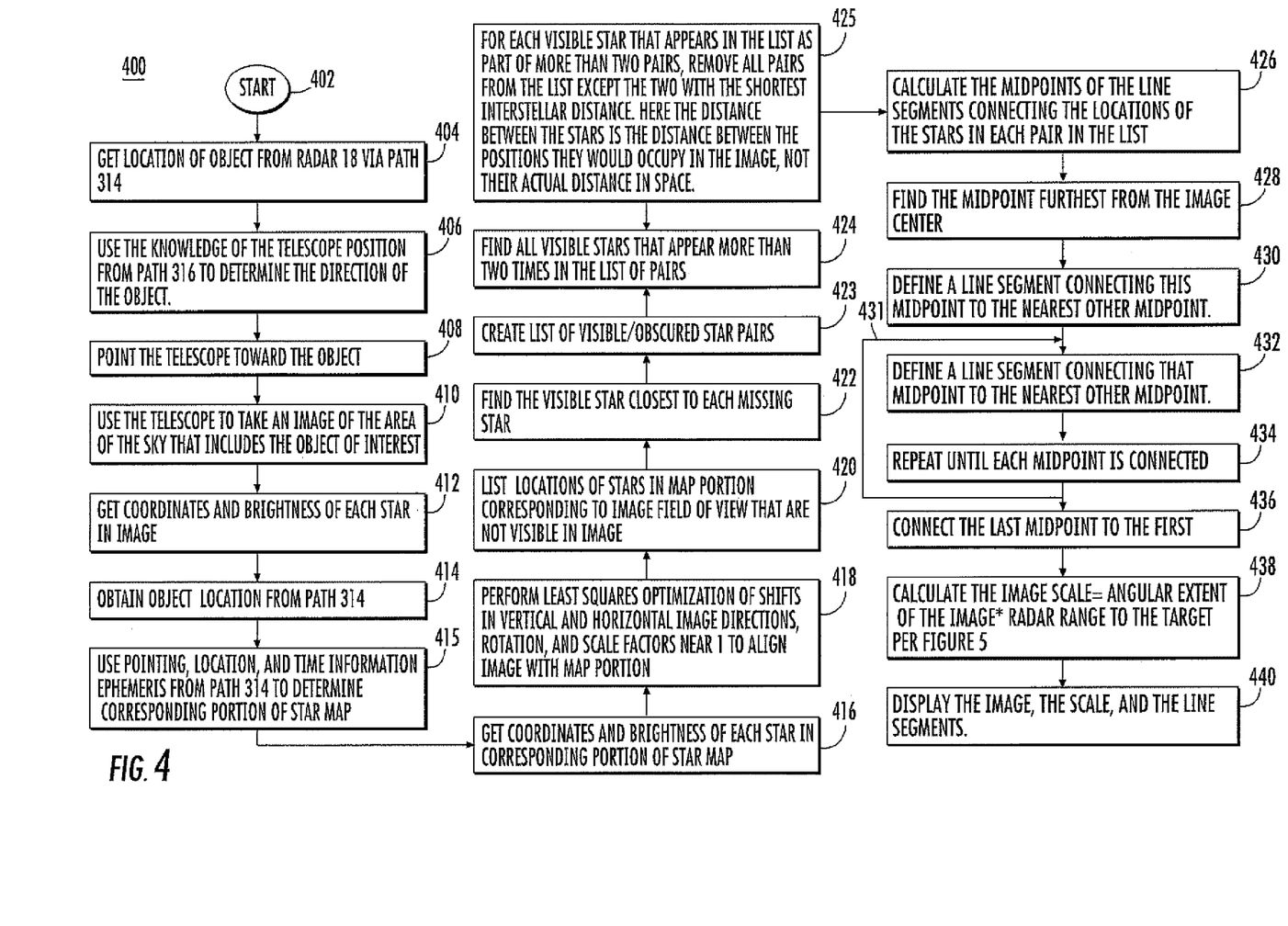
FIG. 4 is a simplified logic flow chart or diagram illustrating the overall processing steps for determining the outline of the object in question.

FIG. 4 is a simplified overall logic flow chart or diagram 400 illustrating the major steps in determining the outline of the object. In FIG. 4, the logic 400 begins at a START block 402, and flows to a block 404, which represents the acquisition of the location of the object of interest from radar 18. From block 404, the processing flows to block 406, which represents the determination of the direction of the object relative to the location and orientation of radar 18. From block 406, the processing flows to block 408, which represents determination of the location and orientation of the telescope 22 relative to the radar 18, and the pointing of the telescope toward the object of interest. From block 408, the processing flows to block 410, which represents the taking of a telescopic picture of the region of sky occupied by the object. From block 410, the processing flows to block 412, which represents the acquisition of the coordinates and brightness of "each" star in the image. Those skilled in the art will understand that the image will include a vast number of stars of every brightness, and only a selection of the brightest is identified by brightness and location. From block 412, the processing flows to block 414, which represents the acquisition by the processor 310 of ephemeris, pointing, location, and time information relating to the object by way of path 314. From block 414, the processing flows to block 415, which represents using that information to determine the approximate portion of the star map that corresponds to the field of view of the image. The portion of the star map which is selected for examination may subtend a larger angle than the field of view of the telescope. The star map cannot represent all of the stars in the mapped region, and will include information on only a selection of the brightest stars. From block 415, the logic flows to a block 416, which represents acquisition of the coordinates and brightness of "each" star in the portion of the star map determined in block 415. From block 416, the logic flows to a block 418, which represents the exact determination of the portion of the star map corresponding to the image field of view. This exact determination is accomplished by least-squares optimization of shifts in vertical and horizontal image directions, rotations, and may include slight scale factor adjustment (that is, application of scale factors having values near 1) to align the image with the map portion. From block 418, the logic flows to block 420, which represents acquisition and listing of the coordinates of "each" star within the field of view that appears on the star map but does not appear in the image. From block 420, the logic flows to block 422, which represents the pairing of each missing star (from among those evaluated) with the closest of the stars visible in the image. From block 422, the logic flows to a block 423, which represents generation of a list of all visible/non-visible star pairs. From block 423, the logic flows to a block 424, which represents the finding, within that list, of all visible stars that appear more than twice. The appearance of visible stars linked to multiple occluded stars is an indication that occluded stars far from the edge of the object are in the list. From block 424, the logic flows to a block 425, which represents the reduction of the list of star pairs to only those that are close to one another (and, hence, close to the edge of the occluding object in the telescope image). In a particular mode of the method, the reduction of the list is accomplished by (a) calculating the distances within the image separating the visible star from each occluded star with which it is paired, (b) finding the two pairs including the visible star with the shortest separation distance, and (c) removing from the list all of the pairs that have greater separations. In this way, only the occluded stars that are close to visible stars are permitted to contribute to the outline of the object. From block 425, the logic flows to a block 426, which represents the finding of the midpoint of each line segment connecting the locations of the stars in a visible/nonvisible pair. From block 426, the logic flows to block 428, which represents selection of one of the midpoints of a line segment as a starting point for the outline of the object. In a particular mode of the method, the selected midpoint is that one which is furthest from the center of the image, but any starting point should be satisfactory. From block 428, the logic flows to a block 430, which represents the definition of a line segment connecting two adjacent midpoints. From block 430, the logic flows to a block 432, which represents the forming of an additional line segment between adjacent midpoints. From block 432, the logic flows to block 434, which represents the forming of additional line segments between adjacent midpoints. Logic 400 of FIG. 4 iterates around a loop including path 431, which fills in all but one of the lines defining the outline of the object. From block 434, the logic ultimately flows to a block 436, which represents the closing of the outline. From block 436, the logic flows to a block 438, which represents the calculation of the image scale. From block 438, the logic 400 of FIG. 4 flows to a block 440, which represents the outputting of the image, scale, and outline to the computer screen 330 (or other display or storage).

Figure 5:
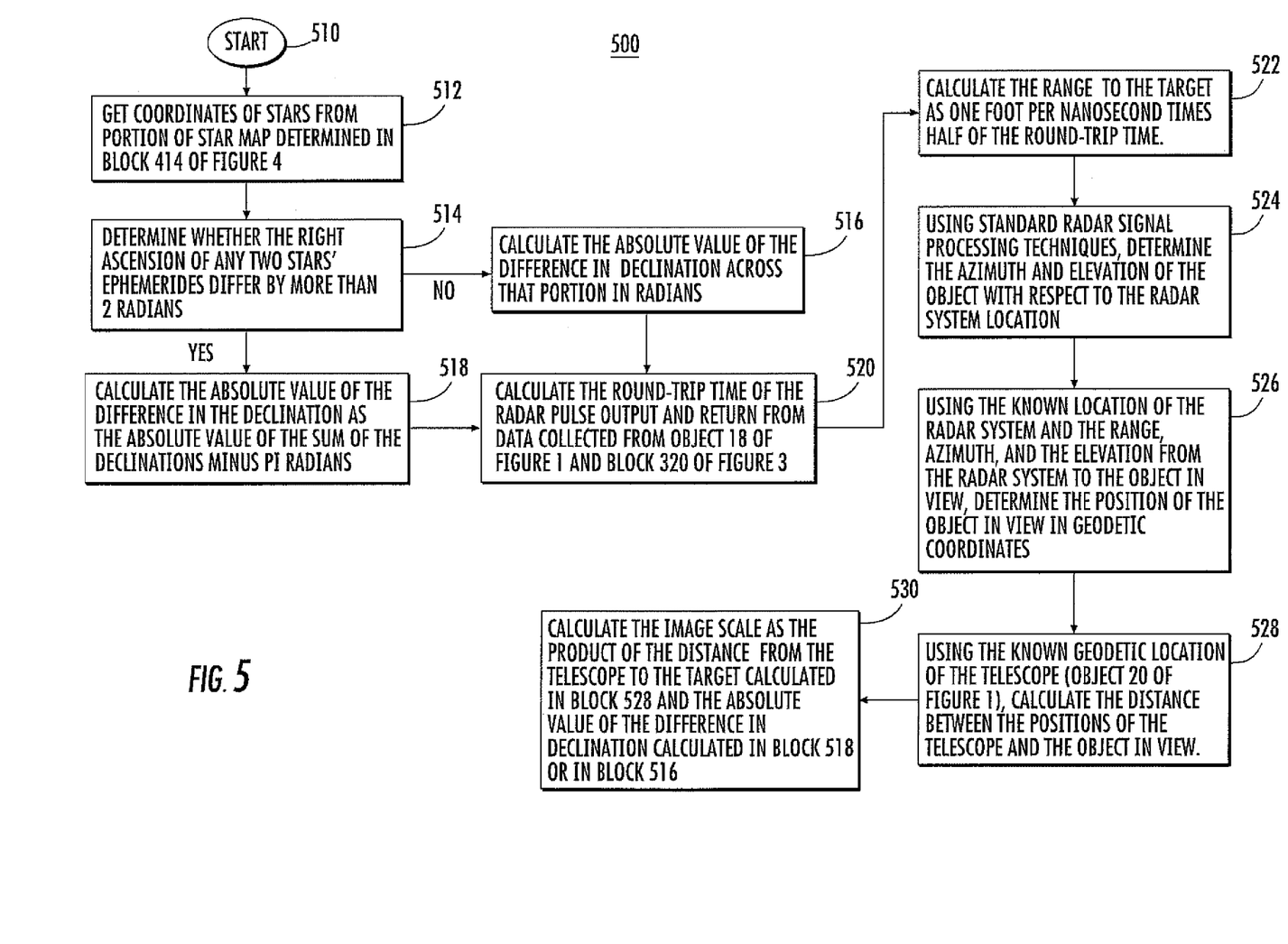
FIG. 5 is a logic flow chart or diagram illustrating details of the processing of FIG. 4.

FIG. 5 is a simplified overall logic flow chart or diagram 500 illustrating the major steps in determining the image scale. In FIG. 5, the logic 500 begins at a START block 510, and flows to a block 512, which represents the acquisition of the coordinates of each star in the portion of the star map determined in block 415. From block 512, the processing flows to a decision block 514, which represents the determination of whether the image includes either stellar pole (declination plus or minus half pi). If it does, the logic 500 leaves block 514 by the YES output, and flows to block 518. Block 518 represents calculation of the angular range of an image that spans a stellar pole. It performs this function by, first, finding the declinations of the top and bottom of the image, and then calculating the absolute value of the difference in the declinations as the absolute value of the sum of the declinations, measured in radians, minus pi radians |declination_dif|=π−|declination1+declination2|. If the image does not include a stellar pole, processing flows from block 514 by the NO output to a block 516. Block 516 represents calculation of the angular range of an image that does not span either pole. Block 516 performs this calculation by, first, finding the declinations of the top and bottom of the image, and then calculating the absolute value of the difference in those declinations, measured in radians. Whether from block 516 or block 518, the processing flows to a block 520. Block 520 represents the calculation of the round-trip time of the radar signal from radar 18 of the system 100 to the object in view and back. From block 520, the processing flows to a block 522, which represents the calculation of the range to the target as the product of the speed of light and one half of the round-trip time. From block 522, the processing flows to a block 524. Block 524 represents the determination of the azimuth and elevation of the object in the reference frame of the radar system 18. From block 524, the processing flows to a block 526. Block 526 represents the calculation of the position of the object in space. From block 526, the processing flows to a block 528, which represents the calculation of the distance from the telescope to the object. From block 528, the processing flows to a block 530. Block 530 represents the calculation of the image scale as the product of the angular extent of the image and the distance from the telescope to the object in view.

It has been thought since ancient times that viewing the sky from the bottom of a well allows stars to be viewed during daylight hours. That is, limiting the field of view can reveal stars during daylight, so long as the sun does not illuminate the depths of the well. Put another way, stars can be seen during daylight hours through an appropriate telescope, which limits the field of view. More recently, it has been discovered that light scattering by the atmosphere tends to obscure dimmer stars, but this should not be a problem when the object is in eclipse. The described method can also be used to determine the outline of an object in near-Earth space when that object is illuminated from above, but the bottom is in shadow and thus not readily seen.

Thus, a method and apparatus according to aspects of the invention determine the shape of an orbiting or airborne object. A radar determines the general location and a telescope is directed toward the object to form an image of background stars, which will be occluded by the object. The image is compared with a memorized star map, to identify the region of the image in the map. Stars visible in the map which are not visible in the image are listed. The invisible stars are paired with next adjacent visible stars to form star pairs. The midpoints are identified of lines extending between star pairs. Segment lines are drawn between a midpoint and the next closest midpoint. The segment lines define an outline of the object.

A method according to an aspect of the invention is for determining the projected shape of an object (14) in an Earth orbit or equivalently in near-Earth space, where the orbit or location includes periods of time in which the object is in Earth's umbra or shadow (15). The method comprises the steps of radar (16) tracking of the object (14) in order to determine its approximate ephemera. The term ephemeris may include any one or all of range, altitude, apogee, axis of orbit and phase of the orbit and location. A "local" radar system (18) is deployed in a location (19) at which it is capable of viewing the object (18); this local radar system (18) may be the same one as that (16) by which the ephemera are determined, or it may be another radar system; in any case, the local radar system (18) is operated to determine the range, azimuth and elevation of the object (14) relative to the local radar (18). An optical telescope (22) is deployed at a location (23) at which it is capable of viewing the region (22V) in which the object (18) is located, and which has a known relationship to the location (19) of the local radar. Using coordinate transformations as may be required, the optical telescope is pointed toward the object (14), thereby producing an image (210) of background stellar objects (214) in an angular field of view (212) encompassing the object (216). A memorized map (324) of stellar objects is provided, which map encompasses at least the field-of-view of the telescope (22). The image (210) of background stellar objects (214) produced by the telescope (22) is compared (310) with the memorized representation of the stellar objects as they would be expected in an unocculted field of view, to thereby identify those stellar objects which are occulted by the object. Using a computer processor (310), an outline (216) of the object is determined from the occulted telescopic image (210) and the unocculted memorized star map. This gives an instantaneous outline of the object. In another mode of the method, the steps of (a) pointing the optical telescope toward the object, (b) comparing the image of background stellar objects with a memorized representation, and (c) using a computer processor, determining from the occulted and unocculted fields of view an outline of the object are repeated, thereby generating a time sequence of outlines of the object, which reveals any changes as a function of time in the projected shape of the object. The outline(s) of the object may be displayed on a monitor.

In a particular mode of a method according to an aspect of the invention, the step of comparing the image of background stellar objects with a memorized representation of the stellar objects as they would be expected in an unocculted field of view, to thereby identify those stellar objects which are occulted by the object includes the steps of obtaining coordinates and brightness of at least some of the stellar objects (relevant objects, such as those with brightness greater than a given value) in the field of view (412), and, using at least pointing, location, and time information, determining (414) that portion of the memorized representation of the stellar objects which corresponds to the field of view. Coordinates and brightness are obtained (416) for relevant ones of the stellar objects in the memorized representation. Least-squared optimization is performed on apparent locations of stellar objects in the portion of the memorized representation and in the image in the field of view, to thereby align the image with the portion of the memorized representation (418). The locations of relevant stellar objects found in that portion of the memorized representation which are missing from the image are listed.

In a particular mode of a method according to an aspect of the invention, the step of determining from the occulted and unocculted fields of view an outline of the object comprises the step (422) of finding that one of the relevant visible stellar objects in the image which is closest to one of the stellar objects missing from the image. Each of the stellar objects which is missing from the image is paired with the closest one of the visible stellar objects, to thereby form a stellar object pair (423). Further, each visible stellar object that has been so included in a pair is associated with only the one or two of the closest occluded stars, to thereby prune the list of stellar object pairs to only closest neighbors. A stellar object pair line is generated for each remaining stellar object pair; the stellar object pair line extends from the location of the missing one of the pair of stellar objects to the visible one of the pair of stellar objects (426). The midpoint of each of the stellar object pair lines is determined (426). The midpoint of one of the stellar object pair lines is connected by an outline segment to the midpoint of the next adjacent one of the stellar object pair lines (428, 430). The step(s) of connecting the midpoint is repeated until all of the midpoints are connected by outline segments to adjacent ones of the midpoints (431). An image of the outline segments is displayed (440).

An apparatus according to an aspect of the invention is for determining the shape of an elevated object (14), such as an airborne or orbiting object. The apparatus comprises a radar system (16,18) at a known location (19). The radar system (16,18) uses electromagnetic radiation (18, 20) to determine the pointing azimuth and elevation of the elevated object (14). A telescope (22) is provided at a known location (23) relative to the location (19) of the radar system (16,18). The telescope (22) is directed toward the elevated object (14) for generating an image (210) of the object (14) occulting a field of background stellar objects (FIG. 2). A memorized (324) map is provided of the locations and brightness of stellar objects in a region, which region desirably includes at least the region of the image. A display (330) is provided for displaying an outline of the elevated object (14). A processor (310) is provided for comparing the map with the image (210), for correlating the map with the image (210), and for identifying relevant stellar objects which are found in the map but missing from the image (210), and for generating from the missing and present stellar objects the outline of the object.

What is claimed is:

1. A method for determining the shape of an object in an Earth orbit, said method comprising the steps of:
    operating a radar system to determine the range, azimuth and elevation of the object relative to the radar;
    deploying an optical telescope at a location at which it is capable of viewing the region in which said object is located and which has a known relationship to the location of the radar;
    pointing said optical telescope toward said object, thereby producing an image of background stellar objects in an angular field of view encompassing said object;
    providing a memorized representation of at least some of the stellar objects in said angular field of view;
    comparing said image of background stellar objects with said memorized representation of the stellar objects as they would be expected in an unocculted field of view, to thereby identify some of those stellar objects which are occulted by said object; and
    using a computer processor, determining an outline of the object from said occulted and unocculted stellar objects.

2. A method according to claim 1, further comprising the steps of:
    repeating said steps of
    pointing said optical telescope toward said object;
    comparing said image of background stellar objects with said memorized representation; and
    using a computer processor, determining from said occulted and unocculted fields of view an outline of the object, thereby generating a time sequence of images of said object, which reveals any changes in projected shape of said object.

3. A method according to claim 1, further comprising the step of displaying on a monitor an image of the outline of said object.

4. A method according to claim 3, wherein said step of displaying on a monitor includes the step of displaying on a video monitor.

5. A method according to claim 1, wherein said step of pointing said optical telescope toward said object thereby producing an image of background stellar objects in an angular field of view encompassing said object comprises the steps of:
    determining the location of said radar;
    determining the location of said telescope;

determining from said location of said radar and of said telescope the direction of said object from said telescope;

pointing said telescope in said direction to view said object; and operating said telescope to produce data representing an image of said object.

6. A method according to claim 1, wherein said step of comparing said image of background stellar objects with a memorized representation of the stellar objects as they would be expected in an unocculted field of view, to thereby identify those stellar objects which are occulted by said object includes the steps of:

obtaining coordinates and brightness of at least some of the stellar objects in the field of view (412);

determining that portion of said memorized representation of the stellar objects which corresponds to said field of view;

performing least-squares optimization of apparent locations of stellar objects in said portion of said memorized representation and in said image in said field of view, to thereby align said image with said portion of said memorized representation; and listing the locations of stellar objects in said portion of said memorized representation which are missing from said image.

7. A method according to claim 6, wherein said step of performing least-squares optimization includes the step of obtaining coordinates and brightness of at least some of the stellar objects in said memorized representation in said portion.

8. A method according to claim 6, wherein said step of determining from said occulted and unocculted fields of view an outline of the object comprises the steps of:

finding that one of the visible stellar objects in the image which is closest to one of said stellar objects missing from said image;

pairing each of said stellar objects which is missing from said image with said closest one of said visible stellar objects, to thereby form stellar object pairs;

disregarding those said object pairs that are not among the most nearly co-located of said stellar object pairs;

generating a stellar object pair line for each of said stellar object pairs, said stellar object pair line extending from the location of the missing one of said pair of stellar objects to the visible one of said pair of stellar objects;

determining the midpoint of each of said stellar object pair lines;

connecting the midpoint of one of said stellar object pair lines by an outline segment to the midpoint of the next adjacent one of said stellar object pair lines;

repeating said step of connecting the midpoint until all of said midpoints are connected by outline segments to adjacent ones of said midpoints; and displaying an image of said outline segments.

9. An apparatus for determining the shape of an elevated object, said apparatus comprising:

a radar system at a known location, for using electromagnetic radiation to determine the pointing azimuth and elevation of said elevated object;

a telescope at a known location relative to the location of said radar system, said telescope being directed toward said elevated object for generating an image of said object occulting a field of background stellar objects;

a memorized map of the locations and brightness of at least some stellar objects in a region including at least part of said image;

a display for displaying an outline of said elevated object; and a processor for comparing said map with said image, for correlating said map with said image, and for identifying relevant stellar objects which are found in said map but missing from said image, and for generating from said missing and present stellar objects said outline of said object.

10. A method for determining the shape of an object in an Earth orbit which includes periods of time in which the object is in Earth's umbra, said method comprising the steps of:

radar tracking of said object in order to determine its approximate ephemera including range, altitude, apogee, axis of orbit and phase of the orbit and location;

deploying a radar system in a location capable of viewing the object, and operating the radar to determine the range, azimuth and elevation of the object relative to the radar;

deploying an optical telescope at a location at which it is capable of viewing the region in which said object is located and which has a known relationship to the location of the radar;

pointing said optical telescope toward said object, thereby producing an image of background stellar objects in an angular field of view encompassing said object;

comparing said image of background stellar objects with a memorized representation of the stellar objects as they would be expected in an unocculted field of view, to thereby identify those stellar objects which are occulted by said object; and using a computer processor, determining an outline of the object from said occulted and unocculted stellar objects.

\* \* \* \* \*